(12) United States Patent
Walker

(10) Patent No.: US 11,175,459 B2
(45) Date of Patent: Nov. 16, 2021

(54) OPTICAL WAVEGUIDE CROSSPOINT

(71) Applicant: Axenic Limited, Sedgefield (GB)

(72) Inventor: Robert Walker, Durham (GB)

(73) Assignee: ISOTEK MICROWAVE LIMITED, Yorkshire (GB)

( * ) Notice: Subject to any disclaimer, the term of this patent is extended or adjusted under 35 U.S.C. 154(b) by 76 days.

(21) Appl. No.: 16/954,311

(22) PCT Filed: Dec. 19, 2017

(86) PCT No.: PCT/GB2017/053810
§ 371 (c)(1),
(2) Date: Jun. 16, 2020

(87) PCT Pub. No.: WO2018/115848
PCT Pub. Date: Jun. 28, 2018

(65) Prior Publication Data
US 2021/0080653 A1 Mar. 18, 2021

(30) Foreign Application Priority Data

Dec. 22, 2016 (GB) ..................... 1621943
Sep. 26, 2017 (GB) ..................... 1715564

(51) Int. Cl.
*G02B 6/28* (2006.01)
(52) U.S. Cl.
CPC ................. *G02B 6/2813* (2013.01)
(58) Field of Classification Search
None
See application file for complete search history.

(56) References Cited

U.S. PATENT DOCUMENTS

| 9,709,738 B1 | 7/2017 | Dumais |
| 2005/0036737 A1 | 2/2005 | Stuart |
| 2011/0158584 A1 | 6/2011 | Popovic |

FOREIGN PATENT DOCUMENTS

| CN | 102749676 A | 10/2012 |
| CN | 104639259 A | 5/2015 |

OTHER PUBLICATIONS

International search report on international application No. GB1621943.8.

(Continued)

*Primary Examiner* — Chad H Smith
(74) *Attorney, Agent, or Firm* — Quinn IP Law

(57) ABSTRACT

An optical waveguide crosspoint comprising first and second single multimode interference sections, each single multimode interference section comprising an input face, an output face and sidewalls extending therebetween, the distance between the input face and output face for each single multimode interference section being the; length of the multimode interference section, the lengths of the first and second multimode interference sections being L1 and L2 respectively; at least one primary input optical waveguide connected to the input face of the first single multimode interference section; at least one primary output optical waveguide connected to the output face of the first single multimode interference section; the first single multimode interference section comprising a symmetry axis extending from the center of the input face to the center of the output face; at least one secondary input optical waveguide connected to the input face of the second single multimode interference section; at least one secondary output optical waveguide connected to the output face of the second single multimode interference section; the second single multimode interference section comprising a symmetry axis extending from the center of the input face to the center of (Continued)

the output face; the first and second single multimode interference sections intersecting to form an L shaped compound multimode interference structure; the width of each single multimode interference section in a direction normal to Its symmetry axis being less than 15% of the length of the other single multimode interference section.

30 Claims, 10 Drawing Sheets

(56) References Cited

OTHER PUBLICATIONS

International search report on international application No. GB1715564.9.
International search report on international application No. GB1805222.5.
International search report on international application No. PCT/GB2017/053810.
Heliang Liu et al., "Low-loss waveguide crossing using a multimode interference structure", Optic Communications, vol. 241, p. 99-104, Nov. 1, 2004.
Fujimoto S. et al., "Proposal of InAlGaAs/InAlAs/InP 1*2 cross-point optical switch with mode-spot modulation MMI waveguide and 45[deg.] TIR mirror", Indium Phosphide & Related Materials, 2010 International Conference on Iridium Phosphide and Related Materials (IPRM), IEEE, Piscataway, NJ, USA, p. 1-4. May 31, 2010.
Yang Zhang et al: 11 Ultralow-loss silicon waveguide crossing using Bloch modes in index-engineered cascaded multimode-interference couplers, OpticS Letters, Optical Society of America, vol. 38, No. 18, p. 3608-3611. Sep. 15, 2013.

OPTICAL WAVEGUIDE CROSSPOINT

The present invention relates to an optical waveguide crosspoint. More particularly, but not exclusively, the present invention relates to an optical waveguide crosspoint comprising first and second single multimode interference sections, the two single multimode interference sections intersecting to form an L shaped compound multimode interference structure, the width of each single multimode interference section being less than 15% of the length of the other multimode interference section. The present invention also relates to an optical waveguide crosspoint comprising first and second multimode interference sections, the two multimode interference sections intersecting to form a T shaped compound multimode interference structure, the width of the arms of the T being less than 15% of the length of the stem of the T.

Optical waveguide crosspoints are known. Such crosspoints are invariably of an '+' shape. Each of the four arms of the crosspoint is a 1×1 multimode interference section designed to have the property whereby an optical signal at one end is re-imaged at the other end. An optical signal which enters (for example) the left arm of the crosspoint from a waveguide is re-imaged at the center of the crosspoint and then re-imaged again at the end of the right arm of the crosspoint where it is received by a further waveguide. An optical signal which enters the top arm of the crosspoint is re-imaged at the center of the crosspoint and then re-imaged again at the end of the bottom arm where it is received by a further waveguide.

A typical example of such an optical waveguide crosspoint is disclosed in H Chen and A W Poon, "Low loss multimode interference based crossings for silicon wire waveguides", *IEEE Photonics Technology Letters*, vol 18, No 21, pp 2260-2226, 1 Nov. 2006. Each arm of the crosspoint has a width direction parallel to its end face and a length direction normal to the width direction. The width of each arm (ie each MMI section) is small, typically of the order fpm. The correct length of an MMI section is proportional to the square of its width and accordingly the width the length, ratio for each MMI section is large, typically of the order 0.45.

Such a crosspoint can work well. There is negligible loss in signals moving between the left and right arms and also the top and bottom arms in the crosspoint. The crosspoint only works well is if is a '+' shape. If one were to move the relative positions of the arms to form a 'T' or an 'L' the crosspoint would show a high loss. The fact that any crosspoints in an optical circuit have to be of a '+' shape is a significant constraint in the design of optical circuits.

The present invention seeks to overcome the problems of the prior art.

Accordingly, in a first aspect, the present invention provides an optical waveguide crosspoint comprising first and second single multimode interference sections, each single multimode interference section comprising an input face, an output face and sidewalls extending therebetween, the distance between the input face and output face for each single multimode interference section being the length of the multimode interference section, the lengths of the first and second multimode interference sections being L1 and L2 respectively;

at least one primary input optical waveguide connected to the input face of the first single multimode interference section;

at least one primary output optical waveguide connected to the output face of the first single multimode interference section;

the first single multimode interference section comprising a symmetry axis extending from the center of the input face to the center of the output face;

at least one secondary input optical waveguide connected to the input face of the second single multimode interference section;

at least one secondary output optical waveguide connected to the output face of the second single multimode interference section;

the second single multimode interference section comprising a symmetry axis extending from the center of the input face to the center of the output face;

the first and second single multimode interference sections intersecting to form an L shaped compound multimode interference structure;

the width of each single multimode interference section in a direction normal to its symmetry axis being less than 15% of the length of the other single multimode interference section.

Due to the relative dimensions of the multimode interference sections the compound multimode interference section shows minimal loss in signals passed between the primary input and output waveguides and also the secondary input and output wavegukies whilst being an L shape rather than the known '+' shape. In addition, there is no need to gang multimode interference sections together. This improves tolerance to variations in wavelength. It also relaxes manufacturing tolerances.

Preferably the width of each single multimode interference section is less than 10%, more preferably 5% of the length of the other single multimode interference section.

Preferably the lengths of the two single multimode interference sections are identical.

Preferably the widths of the two single multimode interference sections are identical.

Preferably the first single multimode interference section comprises a plurality of primary output optical waveguides connected to the output face.

Preferably the first single multimode interference section comprises a plurality of primary input optical waveguides connected to the input face.

Preferably the second single multimode interference section comprises a plurality of secondary output optical waveguides connected to the output face.

Preferably the second single multimode interference section comprises a plurality of secondary input optical waveguides connected to the input face.

Preferably the width of each single multimode interference section is at least 2 µm, more preferably at least 3 µm, more preferably at least 4 µm.

Preferably the first single multimode interference section is dimensioned to have a primary re-imaging length of L1 at wavelength λ1

Preferably the first single multimode interference section is dimensioned to have a secondary re-imaging length at λ1 of less than L1

Preferably the optical waveguide crosspoint further comprises an optical source connected to at least one primary input optical waveguide, the optical source being adapted to provide a signal at wavelength λ1.

Preferably the second single multimode interference section is dimensioned to have a primary re-imaging length of L2 at wavelength λ2

Preferably the second single multimode interference section is dimensioned to have a secondary re-imaging length at λ2 of less than L2.

Preferably the optical waveguide crosspoint further comprises an optical source connected to at least one secondary optical waveguide, the optical source being adapted to provide a signal at wavelength λ2.

In a further aspect the present invention provides an optical waveguide crosspoint comprising first and second multimode interference sections, each comprising an input face, an output face and sidewalls extending therebetween, the distance between the input face and output face for each multimode interference section being the length of the multimode interference section, the lengths of the first and second multimode interference sections being L1 and L2 respectively;

the first multimode interference section being a single or ganged multimode interference section and the second multimode interference section being a single multimode interference section;

at least one primary input optical waveguide connected to the input face of the first multimode interference section;

at least one primary output optical waveguide connected to the output face of the first multimode interference section;

the first multimode interference section comprising a symmetry axis extending from the center of the input face to the center of the output face;

at least one secondary input optical waveguide connected to the input face of the second multimode interference section;

at least one secondary output optical waveguide connected to the output face of the second multimode interference section;

the first and second multimode interference sections intersecting to form a T shaped compound multimode interference structure with the first multimode interference section forming the arms of the T and the second multimode interference section forming the stem of the T;

the width of the first multimode interference section in a direction normal to its symmetry axis being less than 15% of the length of the second multimode interference section.

Due to the relative dimensions of the multimode interference sections the compound multimocle interference section shows minimal loss in signals passed between the primary input and output waveguides and also the secondary input and output waveguides whilst being a T shape rather than the known '+' shape. Again, there is no need to gang MMI sections together which improves tolerance to variations in wavelength and relaxes manufacturing tolerances.

Preferably the width of the first multimode section is less than 10%, more preferably less than 5% of the length of the second multimode section.

Preferably the width of the second multimode interference section is less than 15%, more preferably less than 10%, more preferably less than 5% of the length of the first multimode interference section.

Preferably the first multimode interference section is dimensioned to have a primary re-imaging length of L1 at wavelength λ1 and a secondary re-imaging length at λ1 of less than L1, the symmetry axis of the second multimode interference section being arranged a distance from the input face of the first multimode interference section equal to the secondary reimaging length.

Preferably the secondary re-imaging length is 0.5L1, such that, the two arms of the T are of equal length.

Preferably the first multimode interference section is a single multimode interference section.

Alternatively the first multimode interference section is a ganged multimode interference section at λ1, re-imaging a single image at the secondary reimaging length.

Preferably the optical waveguide crosspoint further comprises an optical source connected to the at least one primary input optical waveguide, the optical source being adapted to provide a signal at wavelength λ1

Preferably the second multimode interference section is dimensioned to have a primary re-imaging length of L2 at λ2.

Preferably the optical waveguide crosspoint further comprises an optical source connected to at least one secondary input optical waveguide, the optical source being adapted to provide a signal at wavelength λ2.

Preferably the first multimode interference section comprises a plurality of primary output optical waveguides connected to the output face.

Preferably the first multimode interference section comprises a plurality of primary input optical waveguides connected to the input face.

Preferably the second multimode interference section comprises a plurality of secondary output optical waveguides connected to the output face.

Preferably the second multimode interference section comprises a plurality secondary input optical waveguides connected to the input face.

Preferably the width of each multimode interference section is at least 2 μm, more preferably at least 3 μm, more preferably at least 4 μm.

The present invention will now be described by way of example only and not in any limitative sense with reference to the accompanying drawings in which FIG. 1 shows a single mode optical waveguide in vertical cross section;

FIG. 3($b$) shows a further embodiment of a known multimode interference section illustrating 1×2 re-imaging at the end of the MMI section;

FIG. 3($c$) shows a further embodiment of a known multimode interference section illustrating re-imaging at multiple re-imaging lengths;

Figure 1:
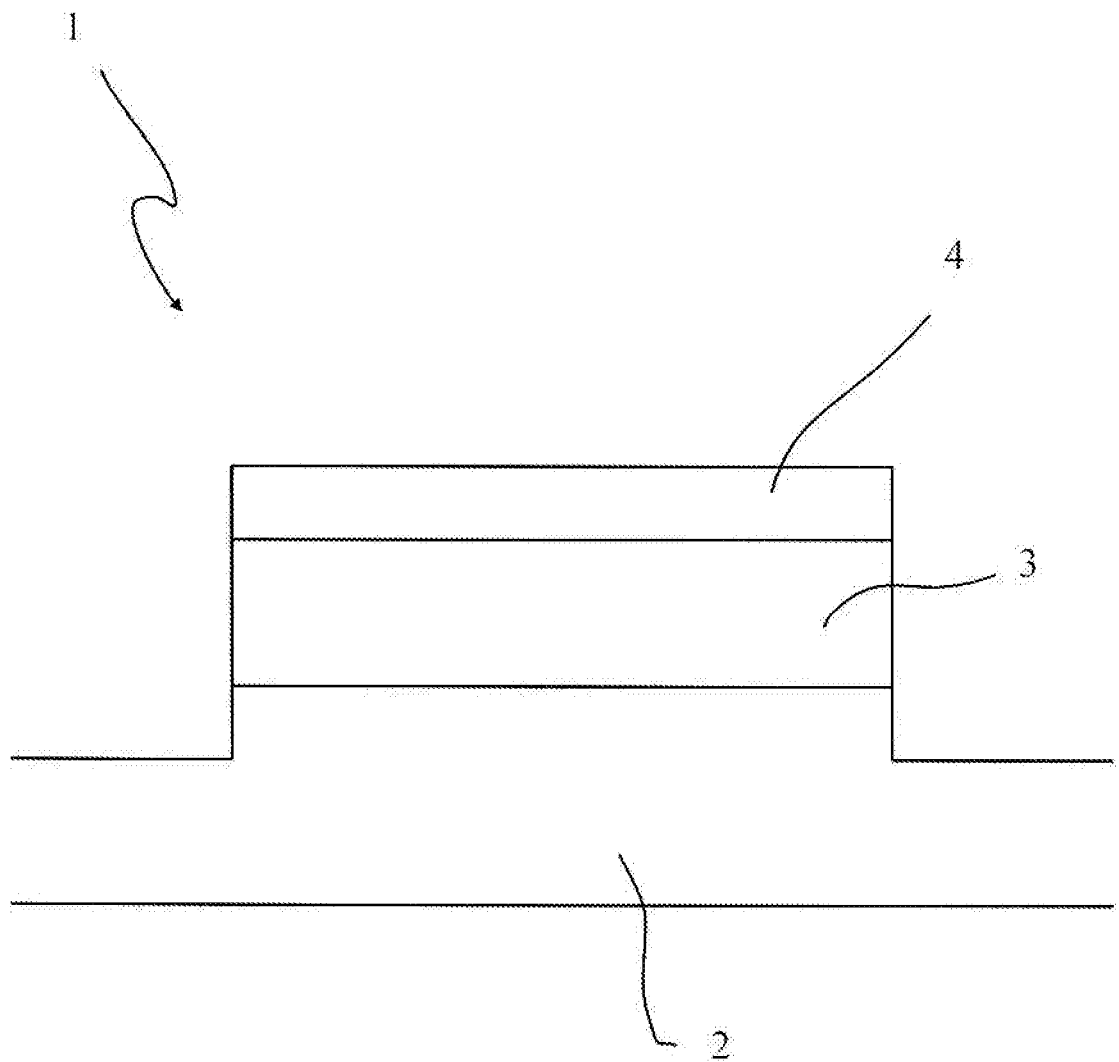

FIG. 1 shows a typical optical waveguide 1 in vertical cross section. The optical waveguide 1 comprises an AlGaAs substrate 2. Arranged on the substrate 2 is a GaAs core 3. Arranged on the core 3 is an AlGaAs cap 4. The vertical arrangement of layers achieves vertical confinement of the light within the core layer 3; lateral confinement of the light is secured by restricting the said layers 3,4 to a raised ridge structure by means of etching or other procedure. The optical waveguide 1 can support one or more optical modes along the waveguide 1. The theory of such waveguides 1 is well known and will not be described in detail. The invention is not limited to AlGaAs waveguides 1 or to the etched laminar waveguide type. Waveguides 1 made in silicon, silica or InP/InGaAsP for example have equivalent properties.

Figure 2:
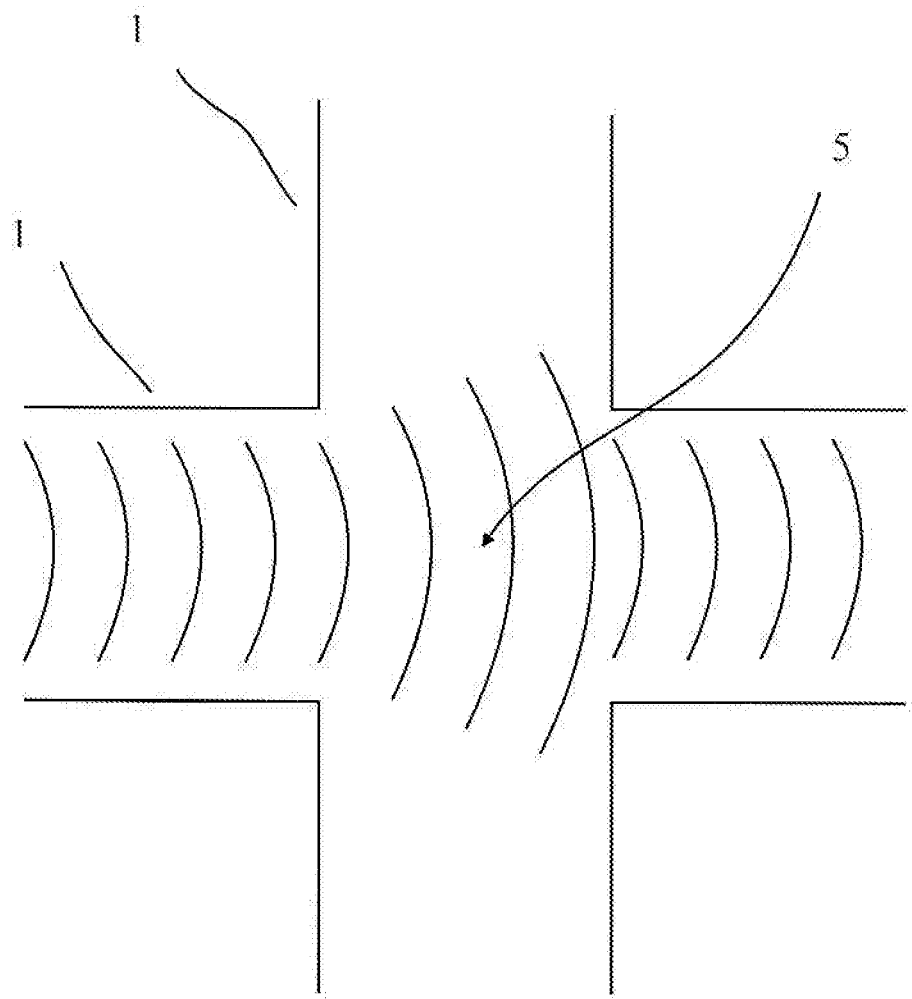
FIG. 2 shows two single mode optical waveguides crossing each other.

FIG. 2 shows two such optical waveguides 1 from above crossing each other at a crosspoint 5. From the point of view of each individual waveguide 1 the crosspoint 5 represents a short, section lacking any lateral confinement. As an optical signal consisting of a light beam crosses the crosspoint 5, diffraction causes the light beam to spread out as shown. As the signal re-enters the waveguide 1 on the other side of the crosspoint 5 the light beam is clipped. This results in power loss and may also excite undesirable higher order even modes of the waveguide 1.

Figure 3A:
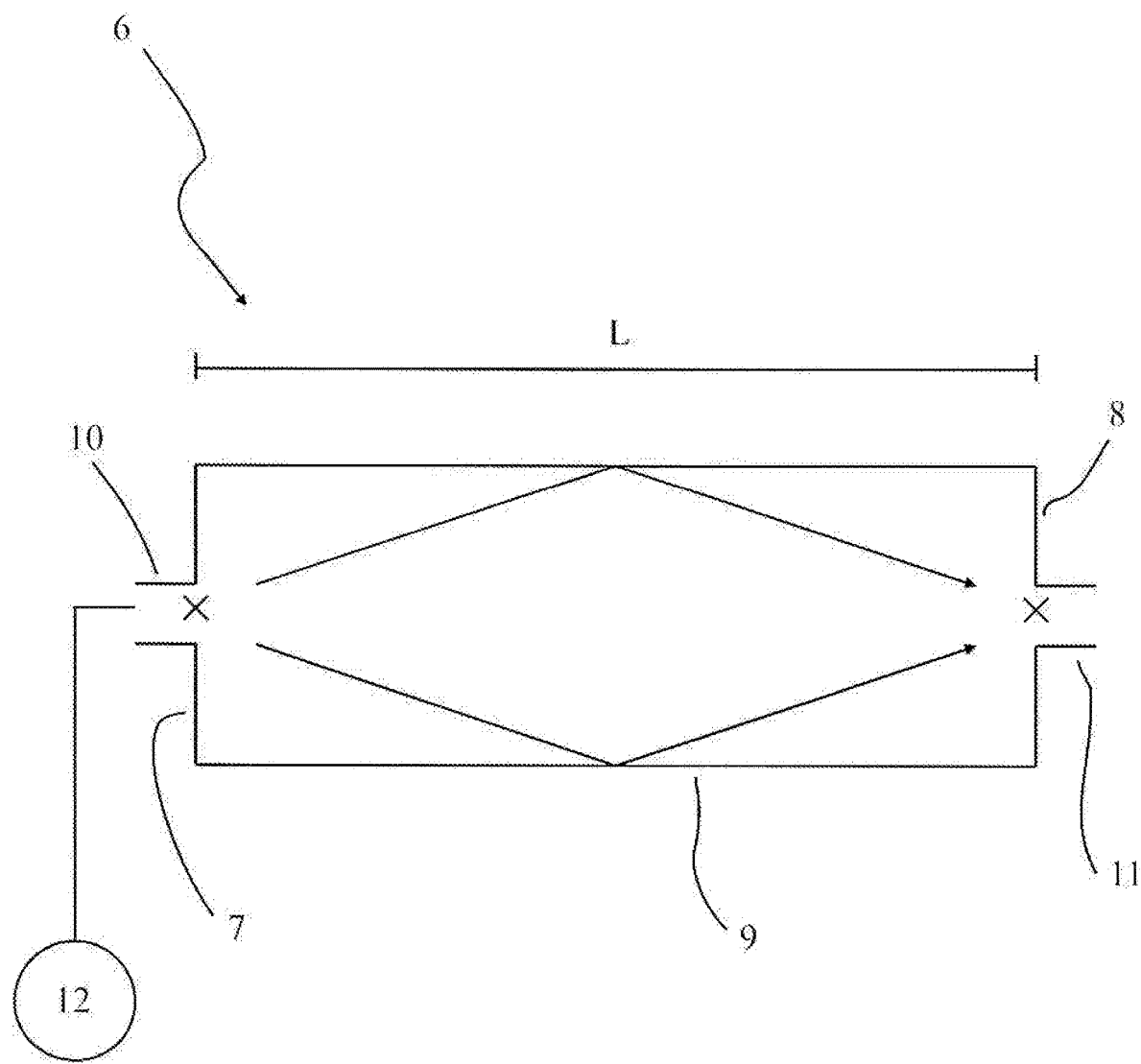
FIG. 3($a$) shows a known multimode interference section illustrating 1×1 re-imaging at the end of the MMI section.

Shown in FIG. 3(a) is a known multimode interference (MMI) section 6. The multimode interference section 6 comprises an input face 7, an output face 8 and side walls 9 extending therebetween. The multimode interference section 6 has a length L between the input and output faces 7,8. An input optical waveguide 10 is connected to the center of the input face 7. An output optical waveguide 11 is connected to the center of the output face 8. In use an optical signal passes from the input optical waveguide 10 into the MMI section 6. The abrupt widening as the signal passes from the narrow input waveguide 10 into the wider MMI section 6 excites higher even order guided modes which create well controlled interference patterns over the length of the MMI section 6. Because the modal propagation constants are in a well-known geometric relationship the launch profile is recreated at a distance equal to the beat length of the two lowest order modes from the input face. The MMI section 6 can essentially be considered to have a lens like property, focusing the launch profile at this distance from the input face 7. This distance is commonly referred to as the re-imaging length. The re-imaging length is wavelength dependent and also dependent on the geometry of the MMI section 6. Typically the input optical waveguide 10 is connected to an optical signal source 12 which provides a signal at a wavelength for which the re-imaging length of the MMI section 6 is equal to L. In that way a fundamental mode (or any even mode) signal provided to the MMI section 6 by the input optical waveguide 10 is imaged at the center of the output face 8 of the MMI section 6 at the join with the output optical waveguide 11. Even order modes have a symmetric field profile while odd modes have an anti-symmetric profile. Even mode signals have a field maximum at the center, an even number of zero crossings, and an odd number of lobes. Odd orders have a zero crossing at the center, an odd number of zero crossings and an even number of lobes.

The multimode interference section 6 shown in FIG. 3(a) is a 1×1 multimode interference section, having one input optical waveguide 10 and one output optical waveguide 11. Any odd order modes of the signal passing along the input optical waveguide 10 are re-imaged towards the outer edges of the output face 8 and so do not pass from the MMI section 6 into the output waveguide 11. Such multimode interference sections 6 are therefore used as mode filters to reject the odd-order modes in the optical circuit which are typically generated by asymmetric disturbances such as waveguide bends.

Figure 3B:
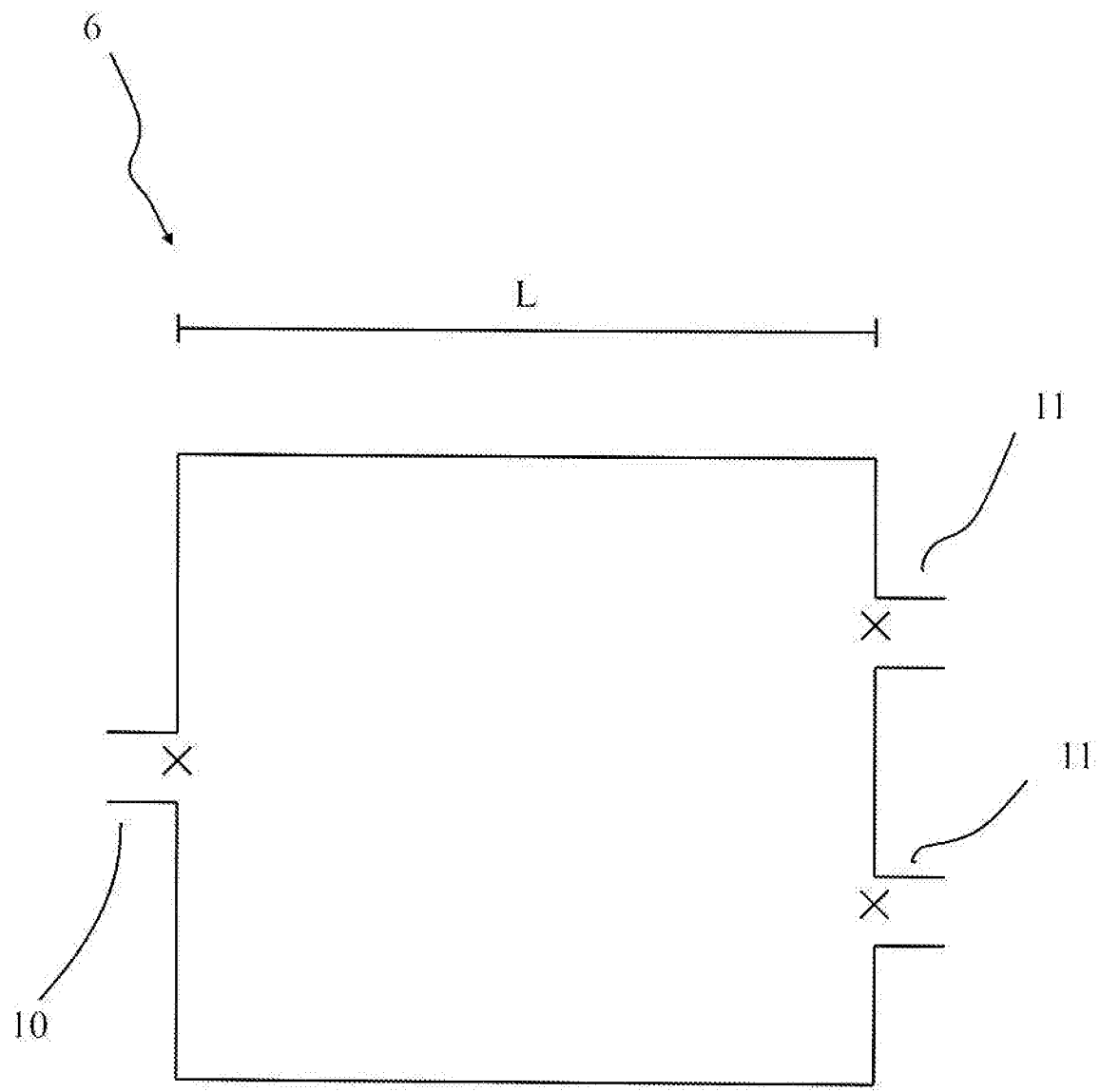

Shown in FIG. 3(b) is an alternative embodiment of a known MMI section 6. This multimode interference section 6 is a 1×2 multimode interference section, being connected to one input optical waveguide W and two output optical waveguides 11. In this embodiment the multimode interference section 6 creates two images of the input signal provided by the input optical waveguide 10, one at each of the output optical waveguides 11. Such an MMI section 6 can be considered to be an MMI section 6 similar to that of FIG. 1 but of half the length and which makes use of the dual image which naturally occurs half way along the length of the 1×1 MMI section 6. Such MMI sections 6 find common application as optical power splitters or in reverse as combiners.

Figure 3C:
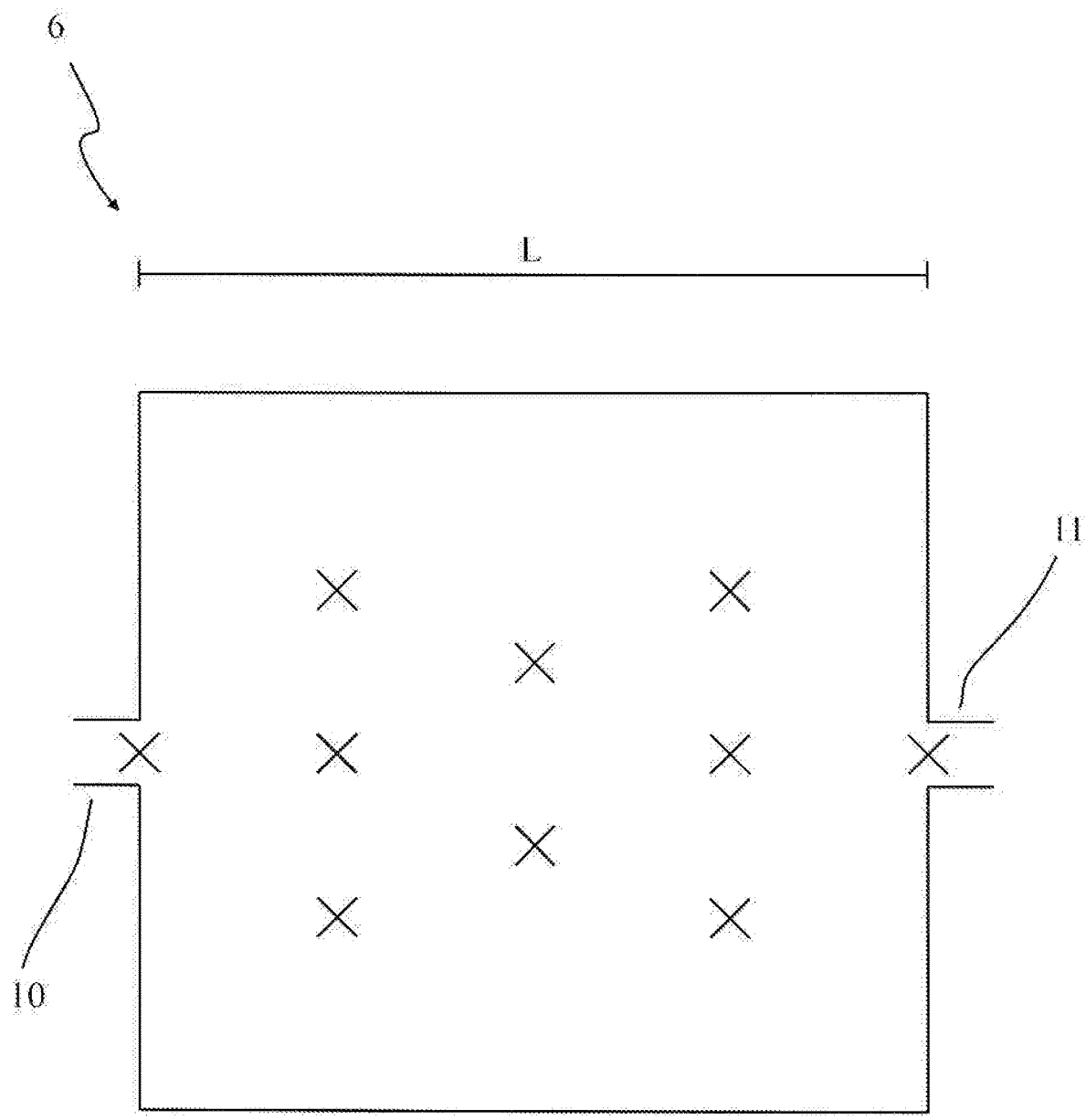

Shown in FIG. 3(c) is a further embodiment of a known multimode interference section 6. This relatively large multimode interference section 6 supports many waveguided modes and so re-images at a plurality of points along the length of the multimode interference section 6 as shown. As before, the wavelength used with the multimode interference section 6 is such that the multimode interference section 6 re-images at the length L so imaging the signal received from the input optical waveguide 10 to the output optical waveguide 11. Re-imaging at the full length of the MMI section 6 is referred to as re-imaging at the primary re-imaging length. Re-imaging at a length less than the length of the MMI section 6 is referred to as re-imaging at a secondary re-imaging length.

Figure 4:
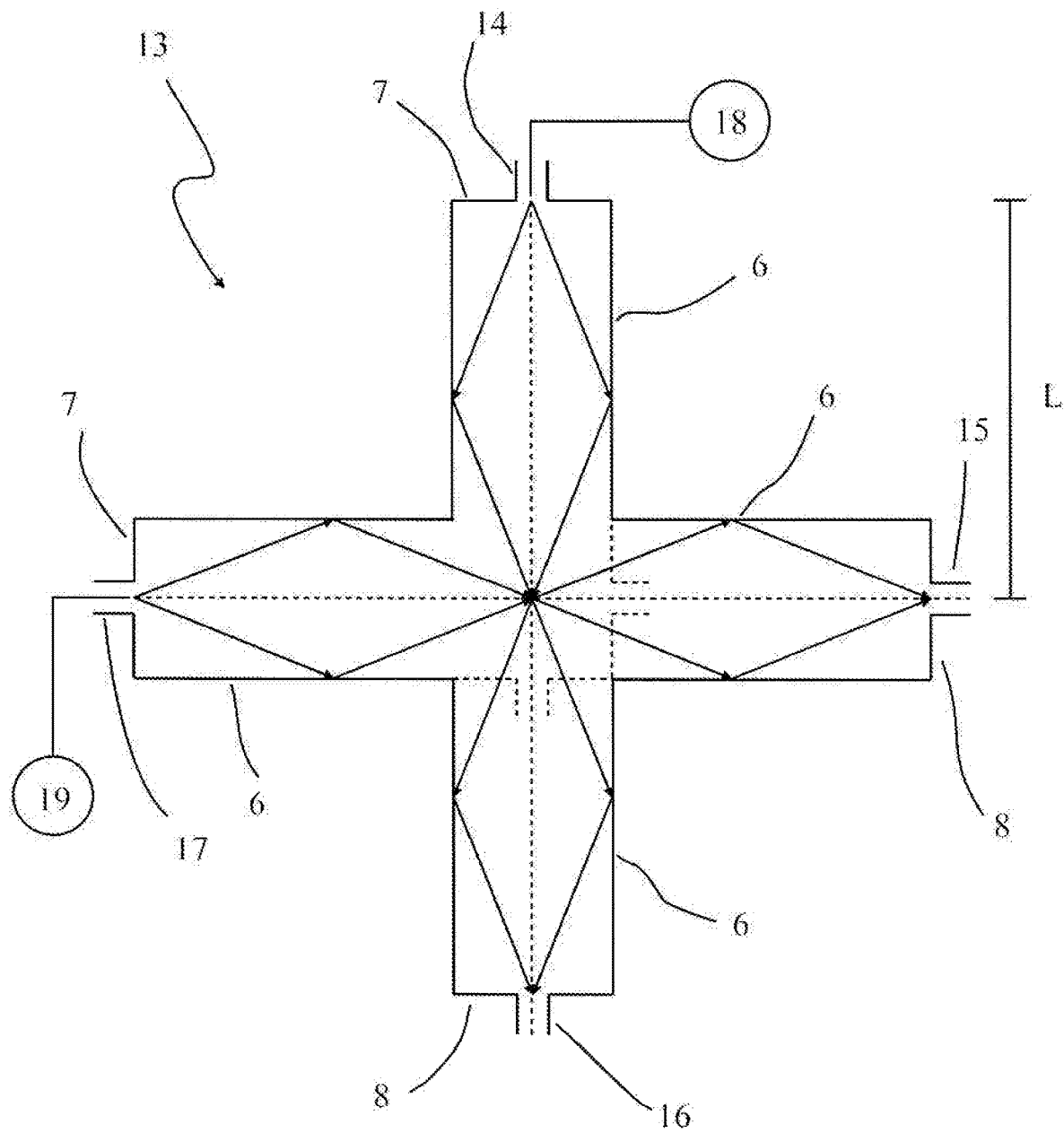
FIG. 4 shows a known optical waveguide crosspoint.

Shown in FIG. 4 is a known optical waveguide crosspoint 13 similar to that disclosed in Chen and Poon. The optical waveguide crosspoint 13 is shaped as an '+' having four arms 6 (North, East, South and West respectively). Attached to each arm 6 is an optical waveguide 14,15,16,17. Each arm 6 is a λ1 multimode interference section 6. Each multimode interference section 6 has a re-imaging length of L at λ1. Attached to two of the optical waveguides 14,17 are optical sources 18,19. Each source 18,19 provides an optical signal at wavelength λ1. The width of each MMI section 6 is small, typically of the order 1 μm and accordingly the width to length ratio of each MMI section 6 is large, typically of the order 0.45.

In use an optical signal passes from an optical waveguide 14,17 into the associated multimode interference section 6. The signal is re-imaged at the center of the crosspoint 13 and then again at the end of the opposite multimode interference section 6 where it is received by a further waveguide 15,16 as shown.

Considering the East-West arms 6 of the optical waveguide crosspoint 13 the electromagnetic field along the side walls of the multimode interference sections 6 varies with distance from the input and output faces 7,8, Close to the input and output faces 7,8 the electromagnetic field is concentrated at the center of the input and output faces 7,8 and is negligible at the side walls. Moving away from the input and output faces 7,8 the electromagnetic field spreads out to fill each MMI section 6 reaching a peak at the side walls. Moving further away from the input and output faces 7,8 the electromagnetic fields are concentrated into an image of the input/output waveguide profile at the center of the optical waveguide crosspoint 13. To each side of this image in the North South, direction the electromagnetic field is relatively small. As the optical signal passes from the East arm 6 to the West arm 6 it is briefly unconfined as it crosses the North-South arms 6. At this crossing point however the electromagnetic field is concentrated way from the side walls and hence the optical signal is unaffected by this lack of confinement.

The optical waveguide crosspoint 13 works well when it is a '+' shape. If (for example) the East and South arms 6 are removed to form an 'L' shaped optical waveguide crosspoint 13 then the crosspoint 13 works less well. In this case the output optical waveguides 15,16 are moved to new positions (shown dotted). Now the unguided crossing width is too large compared to the MMI length and is all at one side of the focus of the L. The optical waveguide crosspoint 6 therefore shows a high loss.

In FIG. 4 each arm 6 is considered to be a single MMI section 6. The East and West arms 6 (for example) are two single MMI sections 6 ganged back to back. The East and West arms 6 together can alternatively be considered to be a single ganged MMI section 6. The difference between a single MMI section 6 and a ganged MMI section 6 is that a ganged MMI section 6 will re-image the image at the input face 7 part way along its length whereas a single MMI section 6 will not. A ganged MMI section 6 can be notionally divided into a plurality of single MMI sections 6.

Figure 5:
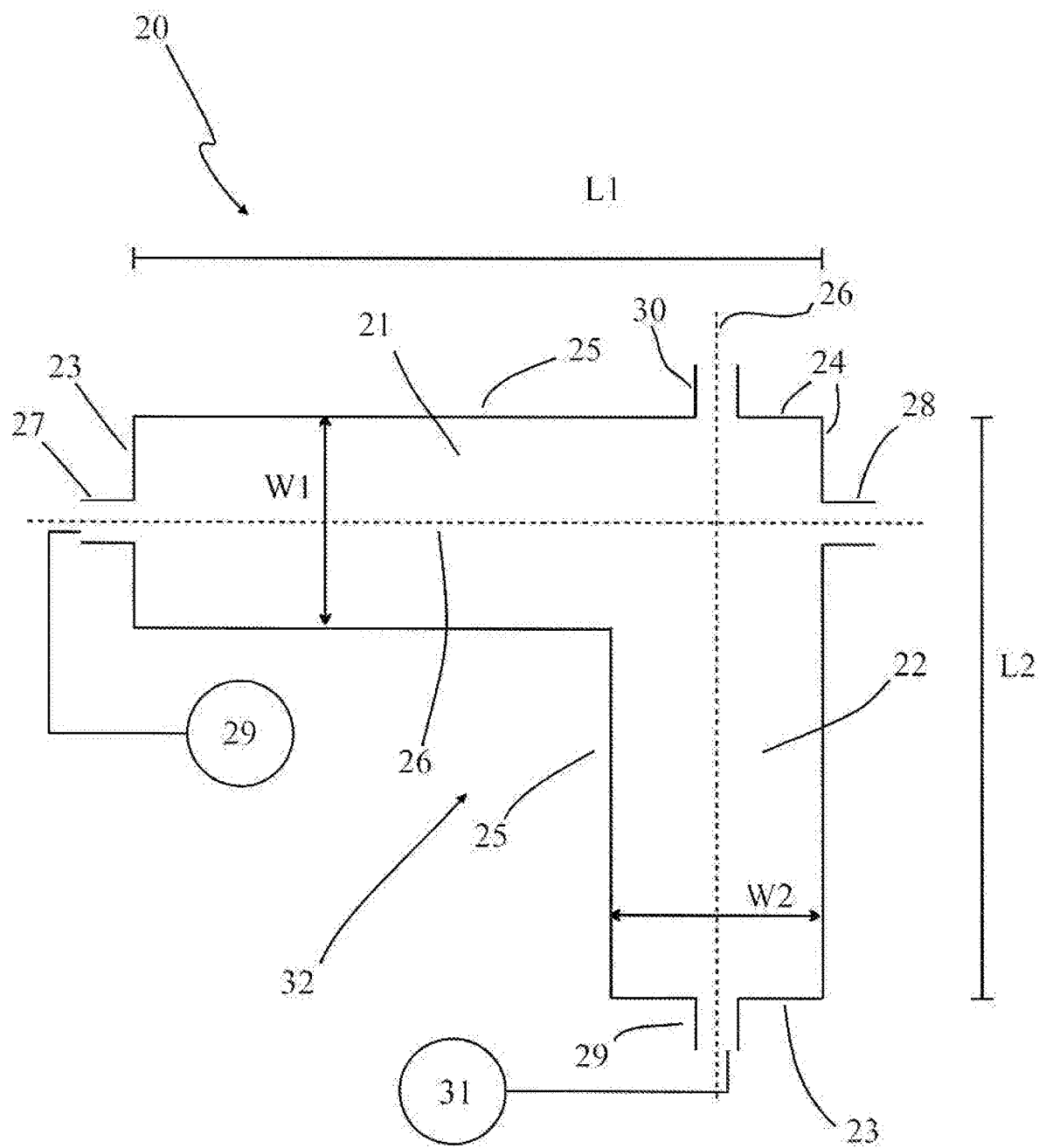
FIG. 5 shows a first embodiment of an optical waveguide crosspoint according to the invention.

Shown in FIG. 5 is an embodiment of an optical waveguide crosspoint 20 according to the invention. The optical waveguide crosspoint 20 comprises first and second single multimode interference sections 21,22. Each single multimode interference section 2122 comprises input and output faces 23,24 and sidewalls 25 extending therebetween. The length of the first single multimode interference section 21 from the input face 23 to the output face 24 is L1. The first single multimode interference section 21 has a primary re-imaging length of L1 at wavelength λ1. The length of the second single multimode interference section 22 from the input face 23 to the output face 24 is L2 and has a primary re-imaging length of L2 at λ2 Each single MMI section 21,22 has a symmetry axis 26 parallel to and equally spaced apart from its sidewalls 25. The width of the first single multimode interference section 21 normal to its symmetry axis 26 is W1. The width of the second single multimode interference section 22 normal to its symmetry axis 26 is W2.

Connected to the input face 23 of the first single MMI section 21 is a primary input optical waveguide 27. Connected to the output face 24 of the first single MMI section 21 is a primary output optical waveguide 28. An optical source 29 providing an optical signal having an even mode component at λ1 is connected to the primary input optical waveguide 27.

Connected to the input face 23 of the second single MMI section 22 is a secondary input optical waveguide 29. Connected to the output face 24 of the second single MMI section 22 is a secondary output optical waveguide 30. An optical source 31 providing an optical signal having an even mode component at λ2 is connected to the secondary input optical waveguide 29.

Each of the waveguides 27,28,29,30 is connected to its associated single MMI section 21,22 along the symmetry axis 26 of the single MMI section 21,22 as shown.

The first and second single multimode interference sections 21,22 intersect to form a compound multimode interference structure 32. In this embodiment the compound multimode interference structure 32 is of an 'L' shape. The output face 24 of the first single MMI section 21 forms part of a side wall 25 of the second single MMI section 22. The output face 24 of the second single MMI section 22 forms part of the side wall 25 of the first single MMI section 21.

The multimode interference sections 21,22 are dimensioned such that the width of each multimode interference section 21,22 is less than 15% of the length of the other multimode interference section 2122. More preferably the width of each multimode section 21,22 is less than 10% of the length of the other multimode interference section 21,22. More preferably the width of each multimode interference section 21,22 is less than 5% of the length of the other multimode interference section 2122.

In use a signal at wavelength λ1 passes from the input face 23 of the first single MMI section 21 to the output face 24 of the first single MMI section 21. Close to the output face 24 of the first single MMI section 21 the electromagnetic field produced by this signal is concentrated away from the side walls 25 of the first single MMI section 21. As the width of the second single MMI section 22 is small compared to the length of the first single MMI section 21 the behaviour of the first single MMI section 21 is insensitive to the presence of the second single MMI section 22. The signal therefore passes along the primary path between the primary waveguides 27,28 without significant loss. The same is true for the second single MMI section 22 and the signal at λ2 passes along the secondary path from one secondary waveguide 29 to the other 30 without significant loss. This embodiment of the invention enables signals to pass through the L shaped composite multimode interference structure 32 without loss of power or generation of higher order modes in both primary and secondary paths.

In an alternative embodiment of the invention the lengths of the two single multimode interference sections 21,22 are equal. In a further alternative embodiment of the invention the widths of the two single multimode interference sections 21,22 are equal. In a further alternative embodiment of the invention both the widths and lengths of the first and second single multimode interference sections 21,22 are equal. In this embodiment both optical sources 29,31 provide optical signals at the same wavelength.

In the above embodiments the first and second single multimode interference sections 21,22 have primary re-imaging lengths of L1 and L2. At least one of these single multimode interference sections may have one or more secondary re-imaging lengths less than L1 or L2 respectively. In this case images are formed part way along the single multimode interference section 21,22 in addition to at its output face 24.

Figure 6:
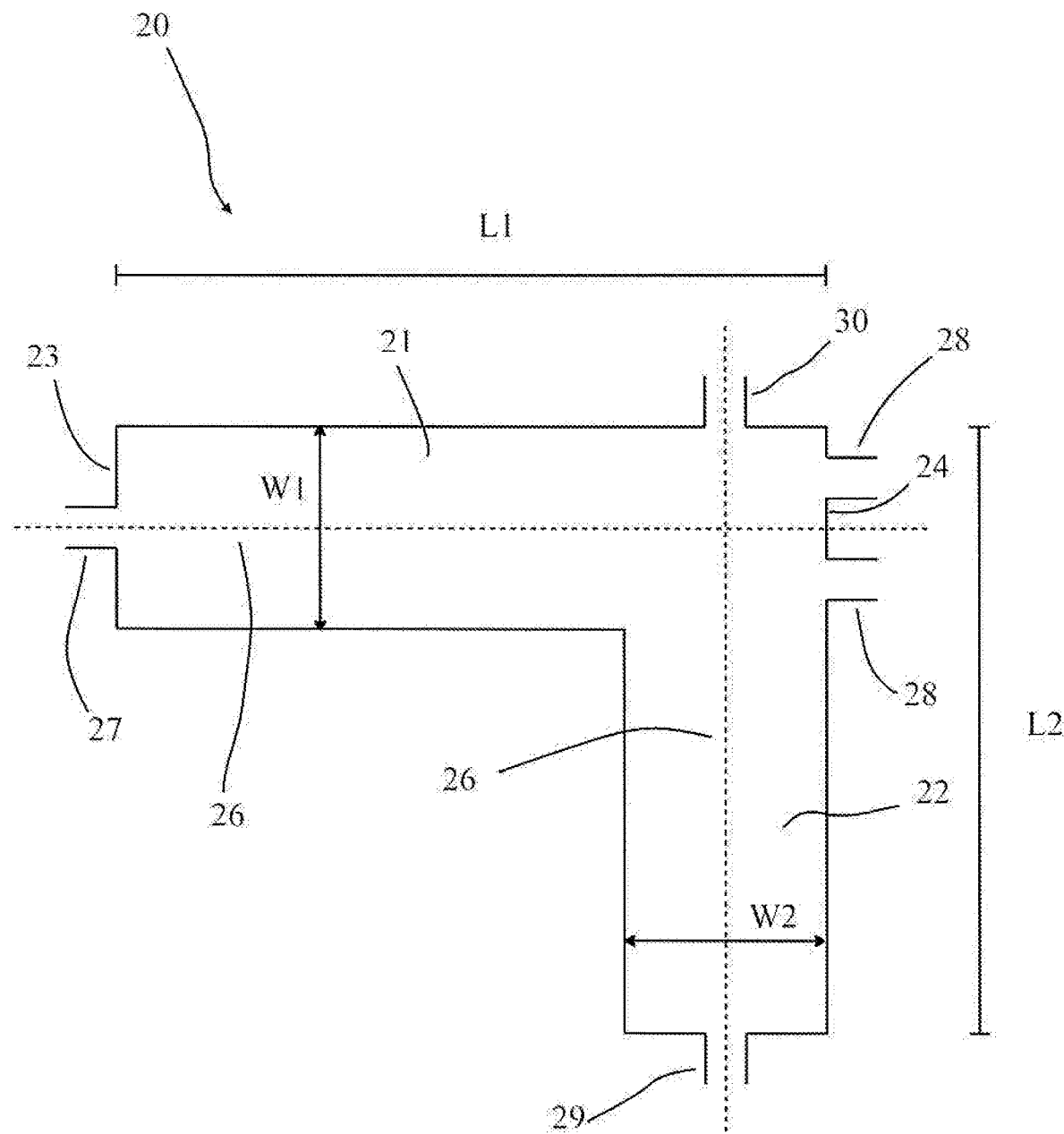
FIG. 6 shows a further embodiment of an optical waveguide crosspoint according to the invention.

Shown in FIG. 6 is a further embodiment of an optical waveguide crosspoint 20 according to the invention. This embodiment is similar to that of FIG. 5 except the first single MMI section 21 has a plurality (in this case two) primary optical output waveguides 28 connected to its output face 24. The first single MMI section 21 is therefore a power splitter, based on a length equal to half the 1×1 re-imaging length. The two single MMI sections 21,22 will generally differ in width as well as length. Several variants of this are possible. In a first alternative embodiment the second single MMI section 22 is proximate to the input face 23 of the first single MMI section 21, rather than the output face 24. In a further alternative embodiment the first single MMI section 21 comprises a plurality of primary optical input waveguides 27 in addition to the plurality of primary optical output waveguides 28. In a further alternative embodiment the first single MMI section 21 comprises a single primary optical input waveguide 27 spaced apart from the symmetry axis 26 and opposite one of the primary optical output waveguides 28. In a further embodiment of the invention the second single MMI section 22 comprises a plurality of secondary input optical waveguides 29 or a plurality of secondary output optical waveguides 30 or both.

Figure 7:
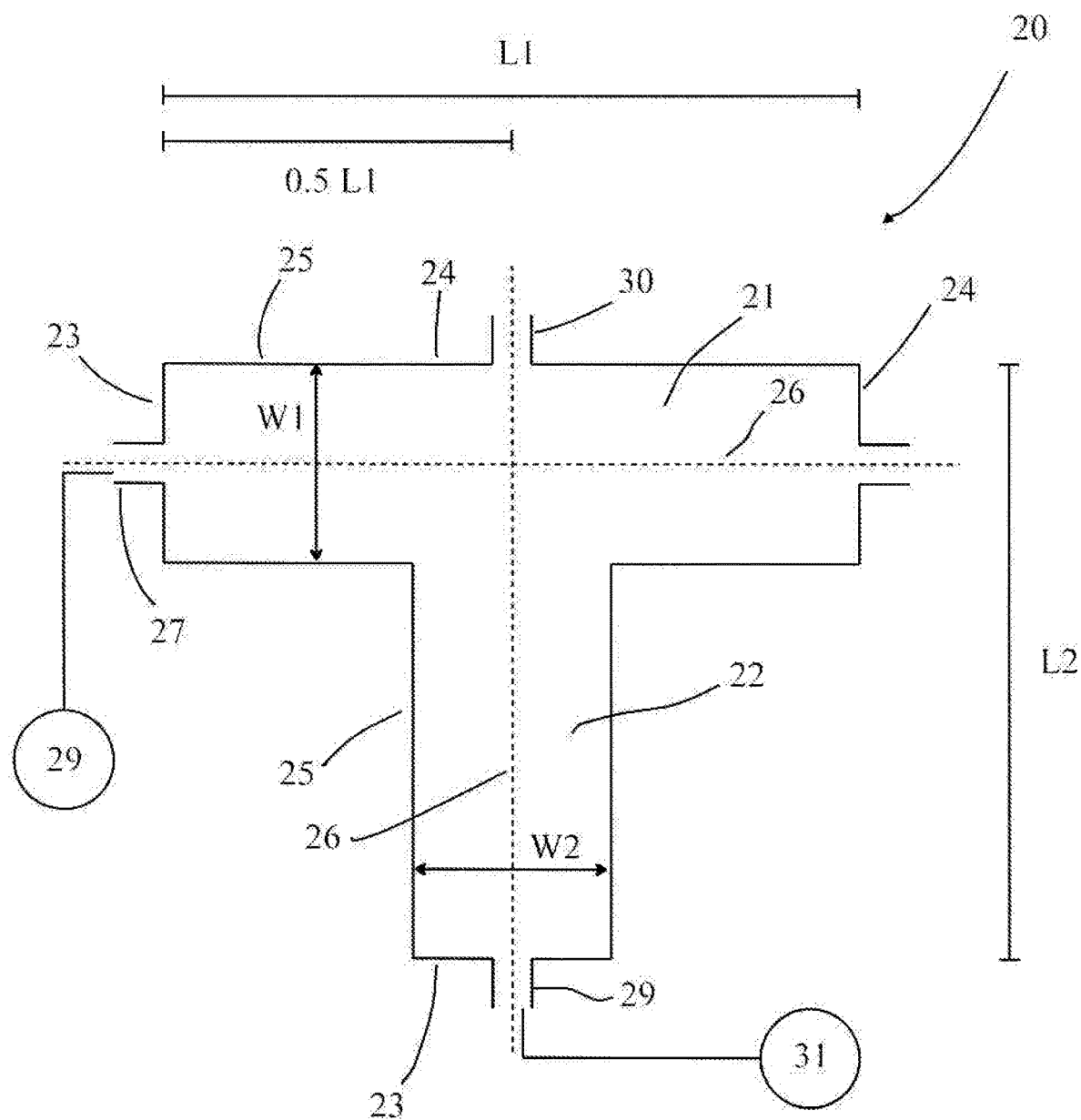
FIG. 7 shows a further embodiment of an optical waveguide crosspoint according to the invention; and, FIG. 8 shows a further embodiment of an optical waveguide crosspoint according to the invention.

Shown in FIG. 7 is a further embodiment of an optical waveguide crosspoint 20 according to the invention. In this embodiment the first and second MMI sections 21,22 intersect to form a compound multimode interference structure 32 in the shape of a 'T' as shown. The second. MMI section 22 forms the stem of the T with the output face 24 of the second MMI section 22 forming part of a side wall 25 of the first MMI section 21. The first MMI section 21 forms the arms of the T. The first multimode interference section 21 has a length L1 from the input face 23 to the output face 24 and a width W1 normal to the symmetry axis 26. The symmetry axis 26 extends from the center of the input face 23 to the center of the output face 24 as before. The second multimode interference section 22 has a length L2 from its input face 23 to its output face 24 and a width W2 normal to its symmetry axis 26. Its symmetry axis 26 extends from the center of its input face 23 to the center of its output face 24. In this embodiment the two arms of the T are the same length, 0.5L1

The width of the first multimode interference section 21 is less than 15% of the length of the second multimode interference section 22. More preferably the width of the first multimode interference section 21 is less than 10%, more preferably less than 5% of the length of the second multimode interference section 22.

Whilst the width of the second multimode interference section 22 is not as tightly constrained as the width of the first multimode interference section 21 it is preferred that the width of the second multimode interference section 22 is less than 15% of the length of the first multimode interference section 21. More preferably the width of the second multimode interference section 22 is less than 10%, more preferably less than 5% of the length of the first multimode interference section 21.

Connected to the primary input optical waveguide 27 is an optical source 29 which provides an optical signal having an even mode component at wavelength $\lambda 1$. The first MMI section 21 is dimensioned to have a primary re-imaging length of L1 and a secondary re-imaging length of 0.5L1 at $\lambda 1$. In this embodiment the first MMI section 21 is a single MMI section. The re-image formed at 0.5L1 could for example be a dual image. In an alternative embodiment the first MMI section 21 is a ganged MMI section having a single image at the input face 23, the output face 24 and 0.5L1. As the arms of the T are of the same length the central symmetry axis 26 of the second MMI section 22 is a distance 0.5L1 from the input face 23 of the first MMI section 21, More generally, the symmetry axis 26 of the second multimode interference section 22 is arranged a distance from the input face 23 of the first multimode interference section 21 equal to the secondary re-imaging length. At this distance from the input face 23 of the first MMI section 21 the electromagnetic field created by the passage of the first signal along the first MMI section 21 is concentrated away from the side walls 25 of the first MMI section 21. The first signal is therefore unaffected by the presence of the second MMI section 22.

An optical source 31 adapted to provide a signal at $\lambda 2$ is connected to the secondary input optical waveguide 29. The second MMI section 22 is a single MMI section and has a primary re-imaging length of L2 at $\lambda 2$. Close to the output face 24 of the second MMI section 22 the electromagnetic field of the signal at $\lambda 2$ is concentrated away from the side walls 25 of the second MMI section 22 and is therefore largely unaffected by the presence of the first MMI section 21 due to, the relatively small width of the first multimode interference section 21. The composite geometry is taken into account when calculating the re-imaging lengths L1 and $\lambda 2$. For example, the second MMI section 22 experiences an effective widening where is it merged into the first MMI section 21. This has a small effect on the optimum value of L2.

In an alternative embodiment of the invention one of the arms of the T is wider than the other in this case the image formerly formed at 0.5L1 is formed closer to one of the input or output faces 23,24 of the first MMI section 21 than the other. Accordingly, in such an embodiment the arms of the T are of different lengths so ensuring the second MMI section 22 crosses the first MMI section 21 at the correct distance from the input face 23 of the first MMI section 21 ie at the position where the image is formed in the first MMI section 21.

Figure 8:
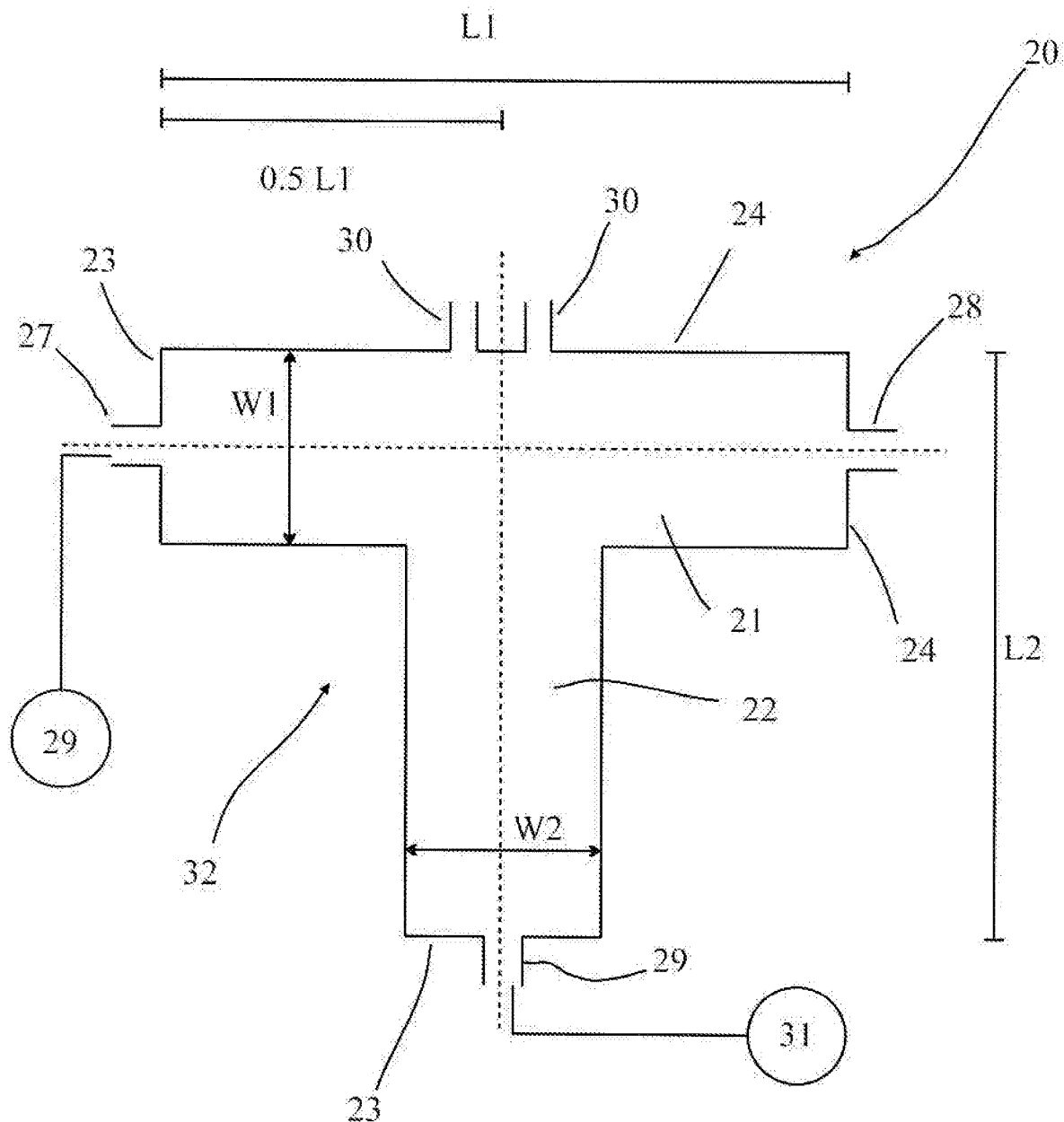

Shown in FIG. 8 is a further embodiment of an optical waveguide crosspoint 20 according to the invention. This embodiment is similar to that of FIG. 7 except the second multimode interference section 22 includes a plurality (in this case two) secondary output optical waveguides 30 connected to its output face 24. The second multimode interference section 22 is again a single MMI section and again has a primary re-imaging length of L2 at $\lambda 2$. In this case the second multimode interference section 22 is a power splitter and produces two images at L2 each of which is received by a corresponding secondary output optical waveguide 30. The first MMI section 21 is dimensioned to have a primary re-imaging length of L1 at $\lambda 1$ and a secondary re-imaging length of 0.5L1 at $\lambda 1$. The first MMI section 21 could be a single MMI section and accordingly this could be a dual image at 0.5L1. Alternatively the first MMI section 21 could be a ganged MMI section with single images at the input face 23, the output face 24 and 0.5L1.

In a further embodiment of the invention the first multimode interference section 21 is either a single or ganged MMI section and is dimensioned to have multiple secondary re-imaging lengths at $\lambda 1$, at least one of which is not at 0.5L1. The second multimode interference section 22 is a single MMI section and is arranged with its symmetry axis 26 at a distance from the input face 23 of the first multimode interference section 21 equal to one of these re-imaging lengths and not equal to 0.5L1 such that the two arms of the T are of unequal length.

In a further alternative embodiment of the invention the first multimode interference section 21 of the T shaped compound multimode interference structure 32 comprises a plurality (typically two) primary output optical waveguides 28 connected to its output face 24. The first multimode interference section 21 is dimensioned to re-image a plurality of images at the output face 24 of the first multimode interference section 21 each of which is received by a corresponding primary output optical waveguide 28. In a further embodiment of the invention the first multimode interference section 21 comprises a plurality (typically two) of primary input optical waveguides 27 connected to its input face 23. In a further alternative embodiment of the invention the second multimode interference section 22 comprises a plurality of secondary input optical waveguides 29 connected to its input face 23.

An important feature of the current invention is that it employs known optical structures. 1×1 MMI sections are commonly employed as odd-mode filters in optical circuits while 1×2 MMI sections are commonly employed as power splitters. These may be present in the circuit close to where the cross point is needed. By passing a secondary waveguide at right angles through such a mode filter or power splitter at a suitable point along its length the mode filter or power splitter can in addition to its primary function provide a low loss optical waveguide crossing point for the primary path (that includes the MMI). By additionally adding a suitably dimensioned MMI to the secondary path intersection both primary and secondary paths may be optimised for low loss.

In all of the above embodiments the symmetry axis 26 of the second MMI section 22 is substantially normal to the symmetry axis 26 of the first MMI section 21. This minimises loss and unwanted mode conversion. Substantially normal preferably means within five, degrees, more preferably within two degrees, more preferably with one degree.

The width of the input/output ('interconnect') waveguides 27,28,29,30 is substantially less than the width of the MMI sections 21,22. As an optical guided wave passes from an interconnect waveguide 27,28,29,30 into an MMI section 21,22 the step change in cross section causes controlled and intentional excitation of higher order modes which is the origin of the re-imaging effect in the MMI sections 21,22.

Typically the widths of the multimode interference sections 21,22 are at least 2 μm. More preferably they are at least 3 μm, more preferably at least 4 μm.

The invention claimed is:

1. An optical waveguide crosspoint comprising:
first and second single multimode interference sections, each single multimode interference section comprising an input face, an output face and sidewalls extending therebetween, a distance between the input face and output face for each single multimode interference section being a length of the multimode interference section, the lengths of the first and second multimode interference sections being L1 and L2 respectively;
at least one primary input optical waveguide connected to the input face of the first single multimode interference section;
at least one primary output optical waveguide connected to the output face of the first single multimode interference section;
the first single multimode interference section comprising a symmetry axis extending from a center of the input face to a center of the output face;
at least one secondary input optical waveguide connected to the input face of the second single multimode interference section;
at least one secondary output optical waveguide connected to the output face of the second single multimode interference section;
the second single multimode interference section comprising a symmetry axis extending from the center of the input face to the center of the output face;
the first and second single multimode interference sections intersecting to form an L shaped compound multimode interference structure;
a width of each single multimode interference section in a direction normal to its symmetry axis being less than 15% of the length of the other single multimode interference section.

2. The optical waveguide crosspoint as claimed in claim 1, wherein the width of each single multimode interference section is less than 10%, more preferably 5% of the length of the other single multimode interference section.

3. The optical waveguide crosspoint as claimed in claim 1, wherein the lengths of the two single multimode interference sections are identical.

4. The optical waveguide crosspoint as claimed in claim 1, wherein the widths of the two single multimode interference sections are identical.

5. The optical waveguide crosspoint as claimed in claim 1, wherein the first single multimode interference section comprises a plurality of primary output optical waveguides connected to the output face.

6. The optical waveguide crosspoint as claimed in claim 1, wherein the first single multimode interference section comprises a plurality of primary input optical waveguides connected to the input face.

7. The optical waveguide crosspoint as claimed in claim 1, wherein the second single multimode interference section comprises a plurality of secondary output optical waveguides connected to the output face.

8. The optical waveguide crosspoint as claimed in claim 1, wherein the second single multimode interference section comprises a plurality of secondary input optical waveguides connected to the input face.

9. The optical waveguide crosspoint as claimed in claim 1, wherein the width of each single multimode interference section is at least 2 μm, more preferably at least 3 μm, more preferably at least 4 μm.

10. The optical waveguide crosspoint as claimed in claim 1, wherein the first single multimode interference section is dimensioned to have a primary re-imaging length of L1 at wavelength λ1.

11. The optical waveguide crosspoint as claimed in claim 10, wherein the first single multimode interference section is dimensioned to have a secondary re-imaging length at λ1 of less than L1.

12. The optical waveguide crosspoint as claimed in claim 10, further comprising an optical source connected to at least one primary input optical waveguide, the optical source being adapted to provide a signal at wavelength λ1.

13. The optical waveguide crosspoint as claimed in claim 1, wherein the second single multimode interference section is dimensioned to have a primary re-imaging length of L2 at wavelength λ2.

14. The optical waveguide crosspoint as claimed in claim 13, wherein the second single multimode interference section is dimensioned to have a secondary re-imaging length at λ2 of less than L2.

15. The optical waveguide crosspoint as claimed in claim 13 further comprising an optical source connected to at least one secondary optical waveguide, the optical source being adapted to provide a signal at wavelength λ2.

16. An optical waveguide crosspoint comprising:
first and second multimode interference sections, each comprising an input face, an output face and sidewalls extending therebetween, a distance between the input face and output face for each multimode interference section being a length of the multimode interference section, the lengths of the first and second multimode interference sections being L1 and L2 respectively;
the first multimode interference section being a single or ganged multimode interference section and the second multimode interference section being a single multimode interference section;
at least one primary input optical waveguide connected to the input face of the first multimode interference section;
at least one primary output optical waveguide connected to the output face of the first multimode interference section;
the first multimode interference section comprising a symmetry axis extending from a center of the input face to a center of the output face;
at least one secondary input optical waveguide connected to the input face of the second multimode interference section;
at least one secondary output optical waveguide connected to the output face of the second multimode interference section;
the first and second multimode interference sections intersecting to form a T shaped compound multimode interference structure with the first multimode interference section forming arms of the T and the second multimode interference section forming a stem of the T;

a width of the first multimode interference section in a direction normal to its symmetry axis being less than 15% of the length of the second multimode interference section.

17. The optical waveguide crosspoint as claimed in claim 16, wherein the width of the first multimode section is less than 10%, more preferably less man 5% of the length of the second multimode section.

18. The optical waveguide crosspoint as claimed in claim 16, wherein a width of the second multimode interference section is less than 15%, more preferably less than 10%, more preferably less than 5% of the length of the first multimode interference section.

19. The optical waveguide crosspoint as claimed in claim 16, wherein the first multimode interference section is dimensioned to have a primary re-imaging length of L1 at wavelength $\lambda 1$ and a secondary re-imaging length at $\lambda 1$ of less than L1, the symmetry axis of the second multimode interference section being arranged a distance from the input face of the first multimode interference section equal to the secondary reimaging length.

20. The optical waveguide crosspoint as claimed in claim 19, wherein the secondary re-imaging length is 0.5L1, such that the two arms of the T are of equal length.

21. The optical waveguide crosspoint as claimed in claim 19 wherein the first multimode interference section is a single multimode interference section.

22. The optical waveguide crosspoint as claimed in claim 19, wherein the first multimode interference section is a ganged multimode interference section at $\lambda 1$, re-imaging a single image at the secondary reimaging length.

23. The optical waveguide crosspoint as claimed in claim 16, further comprising an optical source connected to the at least one primary input optical waveguide, the optical source being adapted to provide a signal at wavelength $\lambda 1$.

24. The optical waveguide crosspoint as claimed in claim 16 wherein the second multimode interference section is dimensioned to have a primary re-imaging length of L2 at $\lambda 2$.

25. The optical waveguide crosspoint as claimed in claim 24 further comprising an optical source connected to at least one secondary input optical waveguide, the optical source being adapted to provide a signal at wavelength $\lambda 2$.

26. The optical waveguide crosspoint as claimed in claim 16, wherein the first multimode interference section comprises a plurality of primary output optical waveguides connected to the output face.

27. The optical waveguide crosspoint as claimed in claim 16 wherein the first multimode interference section comprises a plurality of primary input optical waveguides connected to the input face.

28. The optical waveguide crosspoint as claimed in claim 16, wherein the second multimode interference section comprises a plurality of secondary output optical waveguides connected to the output face.

29. The optical waveguide crosspoint as claimed in claim 16, wherein the second multimode interference section comprises a plurality of secondary input optical waveguides connected to the input face.

30. The optical waveguide crosspoint as claimed in claim 16, wherein the width of each multimode interference section is at least 2 µm, more preferably at least 3 µm, more preferably at least 4 µm.

* * * * *

UNITED STATES PATENT AND TRADEMARK OFFICE
CERTIFICATE OF CORRECTION

| | | |
|---|---|---|
| PATENT NO. | : 11,175,459 B2 | |
| APPLICATION NO. | : 16/954311 | |
| DATED | : November 16, 2021 | |
| INVENTOR(S) | : Robert Walker | |

It is certified that error appears in the above-identified patent and that said Letters Patent is hereby corrected as shown below:

On the Title Page

Item (73), Assignee name "ISOTEK MICROWAVE LIMITED, Yorkshire ( GB )" is corrected to be --AXENIC LIMITED, Sedgefield ( GB )--

Signed and Sealed this
Fourteenth Day of June, 2022

Katherine Kelly Vidal
*Director of the United States Patent and Trademark Office*